July 4, 1933.   C. W. ANDERSON   1,916,911
DRAIN TRAP
Filed Jan. 2, 1932
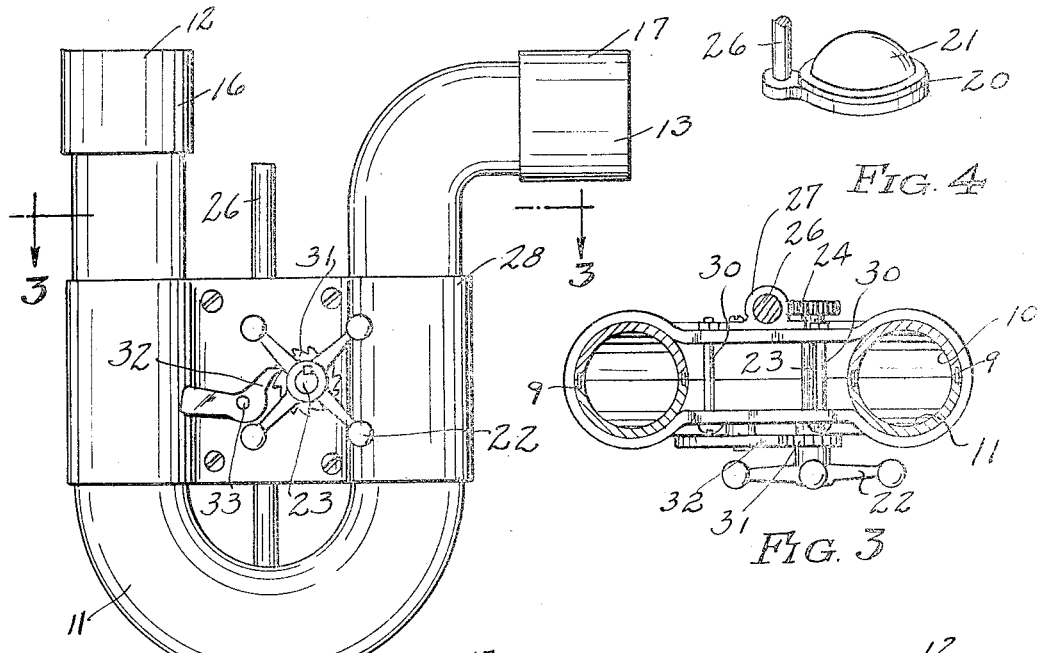
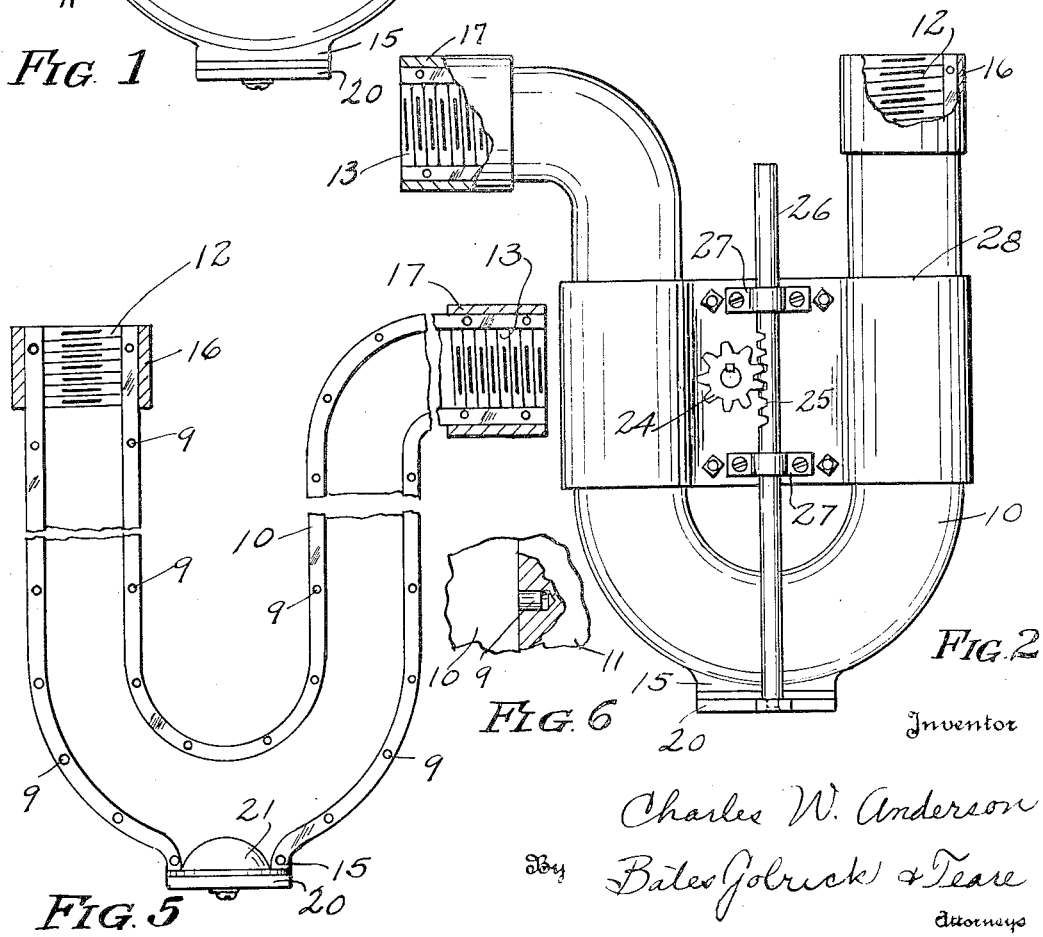
Inventor
Charles W. Anderson
By Bates, Goldrick & Teare
Attorneys Patented July 4, 1933

1,916,911

UNITED STATES PATENT OFFICE

CHARLES W. ANDERSON, OF TOLEDO, OHIO

DRAIN TRAP

Application filed January 2, 1932. Serial No. 584,430.

This invention relates to plumbing fixtures and particularly to drain traps for sinks. One of the objects of the invention is to provide an attachment, which will permit a trap to be drained in a convenient and sanitary manner, without necessitating contact with any of the material that may be lodged in the trap.

A further object is to provide a trap construction which can be made of sheet metal, and thereby, can be produced in a more economical manner than any cast trap of the usual goose neck type. This invention also includes an improved form of means for effectively maintaining and locking the trap in closed position.

Referring now to the drawing, Fig. 1 is a side elevation of a trap embodying my invention viewed from one side thereof; Fig. 2 is a corresponding elevation viewed from the opposite side thereof; Fig. 3 is a section taken on the line 3—3 in Fig. 1; Fig. 4 is a perspective view of the sealing plug; Fig. 5 is an elevation of one of the trap parts, and Fig. 6 is an end elevation, partly in section, and shows one mode of connecting the body parts of the trap together.

I carry out my invention by making the trap body of sheet metal, such as aluminum, approximately one eighth inch in thickness. I then form the body in two parts which are identical in shape, and I provide means for effectively sealing the parts together so as to provide a leak-proof joint therebetween. The trap is shown as having the familiar goose neck form and as comprising two parts which are indicated at 10 and 11. The parts are formed to provide attachment at one end 12 with a basin outlet and at the other end 13 with the waste pipe. Moreover, the parts are formed to provide a discharge branch 15 adjacent the bottom thereof, through which the material lodged in the trap may be withdrawn.

By making the body parts of sheet metal having a thickness of approximately one-eighth inch, I allow sufficient metal to utilize dowel pins 9 for centering the parts and enabling them to be handled as a unit during the manufacturing and assembly process. Preferably, a cementitious material is placed between the parts when they are brought together, so as to insure a liquid tight joint in the finished product. After the parts are joined together, the ends are preferably reinforced by bands 16 and 17, respectively, to avoid rupture while the ends are being internally threaded for receiving the drain and waste pipes respectively. The branch 15 is adapted to be sealed by a removable closure 20 which carries a dome-shaped gasket 21 that fits tightly into the opening and makes a liquid tight joint therewith.

To facilitate the removal of the closure member for cleaning the trap, I have shown a hand wheel 22, which is disposed on one side of the trap and which is fixed to a shaft 23. The shaft has a pinion 24 rigidly mounted thereon adjacent the opposite side of the trap which pinion is adapted to mesh with the rack 25 on an arm 26. This arm is guided for vertical movement in brackets 27 on a support 28, and the lower end of the arm is rigidly fastened to the closure plate 20. Thus, whenever the hand wheel is rotated the plate is moved vertically with reference to the body of the trap.

To support the trap operating mechanism I have shown the support 28 in the form of a band that extends around the body members and that is adapted to be drawn tightly into contact therewith by bolts 30. The band therefore, functions to maintain a liquid tight joint throughout the length of the body.

To maintain the closure in locked position, I have shown a ratchet wheel 31 on the shaft 23, and a coacting dog 32 which is pivotally mounted at 33 on the support, and which is adapted to be selectively withdrawn from engagement with the ratchet whenever the trap is cleaned.

An advantage of my invention is the fact that a drain trap body may be made in an economical manner, and that the mechanism for operating the closure embodies a compact, easily operable mechanism, which is disposed in close proximity to the trap body and is therefore, protected against inadvertent actuation.

I claim:

1. In combinaion, a drain trap body having a drain opening therein, a removable closure for said opening, a bar attached to the closure a rotatable member supported by the body, and gearing including rack teeth on the bar for operatively connecting the member and closure.

2. In combination, a U-shaped drain trap body having a drain opening therein, a support extending across the body, a shaft on said support, a pinion on the shaft, a pinion locking device including a ratchet on the shaft and a pivot on the support, a rack coacting with the pinion and a closure for said opening attached to the rack.

3. In combination, a U-shaped drain trap body, a support extending across the body, said body having a drain opening adjacent the bottom thereof, a closure for said opening, a member journalled on the support and projecting from opposite sides thereof, means disposed on one side of the support for operating said member, and mechanism disposed on the opposite side of the support for operatively connecting the member to the closure.

4. In combination, a drain trap body having a drain opening therein, a band extending transversely of and embracing the body, a removable closure for said opening, said closure having an arm extending upwardly adjacent the midportion of the body, a rack on the arm, a pinion journalled on the band and coacting with the rack, a hand wheel for actuating the pinion, and means for locking the hand wheel in any selective position.

5. A drain trap body having a drain opening therein, a closure for said opening, a band extending transversely of the body a shaft journalled on the band, a hand wheel on the shaft on one side of the band, a pinion on the shaft on the opposite side of the band, a rack coacting with the pinion, and means connecting the rack to said closure.

In testimony whereof, I hereunto affix my signature.

CHARLES W. ANDERSON.